United States Patent
Fukushima et al.

[19]

[11] Patent Number: 6,107,864
[45] Date of Patent: Aug. 22, 2000

[54] CHARGE PUMP CIRCUIT

[75] Inventors: Kazuhiko Fukushima, Hyogo; Atsuo Yamaguchi, Tokyo, both of Japan

[73] Assignees: Mitsubishi Denki Kabushiki Kaisha, Tokyo; Mitsubishi Electric System LSI Design Corporation, Hyogo, both of Japan

[21] Appl. No.: 09/241,087

[22] Filed: Feb. 1, 1999

[30] Foreign Application Priority Data

Aug. 24, 1998 [JP] Japan .................................. 10-237071

[51] Int. Cl.[7] ........................................................ G05F 1/10
[52] U.S. Cl. .............................................. 327/536; 363/60
[58] Field of Search ................................... 327/536, 537, 327/530, 589, 390; 363/60, 59

[56] References Cited

U.S. PATENT DOCUMENTS 5,982,223 11/1999 Park et al. ............................... 327/536
6,037,622 3/2000 Lin et al. ................................. 327/536
6,046,625 4/2000 Menichelli ............................... 327/536

FOREIGN PATENT DOCUMENTS 8-322241 12/1996 Japan .

*Primary Examiner*—Jung Ho Kim
*Attorney, Agent, or Firm*—McDermott, Will & Emery

[57] ABSTRACT

A charge pump circuit comprises a plurality of booster stages. Each booster stage has a first node, a second node, a first charge pump and a second charge pump. Both charge pumps operate in a complementary manner, and raise potential of the second node relative to potential of the first node by transferring charge from the first node to the second node. Each charge pump comprises a pumping capacitor, an NMOS transistor and a PMOS transistor. In each charge pump, the NMOS transistor is used for charging the pumping capacitor with charge input through the first node, and the PMOS transistor is used for discharging the pumping capacitor to send charge to the second node.

8 Claims, 10 Drawing Sheets

CHARGE PUMP CIRCUIT

BACKGROUND OF THE INVENTION

1. Field of the Invention

The present invention relates to a charge pump circuit with a plurality of booster stages, more specifically relates to a charge pump circuit applied to semiconductor circuits such as semiconductor memory device.

2. Description of the Related Art

A semiconductor memory device typically has a charge pump circuit for boosting the power supply voltage to a predetermined high voltage level supplied to several circuits in the memory device. FIG. 6 shows such a typical conventional charge pump circuit. As shown in FIG. 6, the charge pump circuit comprises a plurality of booster stages $CP_i$ (where i=1 to n). Each booster stage $CP_i$ comprises an NMOS transistor $NT_i$ and a pumping capacitor $C_i$. The gate and drain of NMOS transistor $NT_i$ are connected together with one end of pumping capacitor $C_i$. The other end of the pumping capacitor $C_i$ is connected to clock clk in odd-numbered stages, or to clock /clk in even-numbered stages. Clock clk alternately outputs power supply voltage $V_{dd}$ or 0 Volt at a predetermined period. Clock clk and clock /clk output mutually complementary values.

In a charge pump circuit thus comprised, the NMOS transistors $NT_i$ (i=1 to n) in the odd-numbered and those in the even-numbered stages alternately turn on and off with the periodic change in the clocks clk and /clk, and thus sequentially send a charge charged in the pumping capacitor $C_i$ to the next booster stage. Node $ND_i$ of each booster stage is thus sequentially boosted, and a predetermined high voltage boosted from the power supply voltage level $V_{dd}$ is ultimately obtained as the final output voltage $V_{out}$.

FIG. 7 shows a potential of node $ND_i$ (where i=n-2 to n) of booster stages n-2 to n in the charge pump circuit shown in FIG. 6. Note that period A in FIG. 7 is the period in which clock clk outputs power supply voltage $V_{dd}$ and clock /clk outputs 0 V, and period B is the period in which clock clk outputs 0 V and clock /clk outputs power supply voltage $V_{dd}$.

As shown in FIG. 7, in period B, the potential of node $ND_{n-1}$ in stage n-1 is lower than the potential of node $ND_{n-2}$ in stage n-2 by threshold voltage $V_{th}$ of NMOS transistor $NT_n$. Likewise in period A, the potential of node $ND_n$ of stage n is lower than the potential of node $ND_{n-1}$ in stage n-1 by threshold voltage $V_{th}$.

Thus, there is a loss of threshold voltage $V_{th}$ in the boosting process from one booster stage to the next booster stage in a charge pump circuit shown in FIG. 6.

In a charge pump circuit of this type, the substrate bias effect influences operation of the charge pump circuit. That is, when the source voltage of the NMOS transistor rises, threshold voltage $V_{th}$ of the NMOS transistor rises due to the substrate bias effect. The threshold voltage $V_{th}$ of NMOS transistor $NT_n$ thus rises with an increase in the number of booster stages. Cumulative threshold voltage $V_{th}$ loss thus increases, and there is dramatic deterioration in booster efficiency. Switching operations may also not occur normally when threshold voltage $V_{th}$ rises. The number of booster stages is thus limited as a result of these problems, and a high output voltage cannot be achieved.

Japanese Patent Laid-Open Publication No. 08-322241 teaches a charge pump circuit for solving the aforementioned problems. FIG. 8 is a circuit diagram of the major parts of that charge pump circuit.

As shown in FIG. 8, each booster stage $CP_i$ (where i=1 to n) has a pumping capacitor $C_i$, and a transfer gate $PTG_i$ for transferring charge charged in pumping capacitor $C_i$. This transfer gate $PTG_i$ comprises a PMOS transistor. Each booster stage $CP_i$ also has a series circuit comprising a PMOS transistor $PT_i$ and an NMOS transistor $NT_i$ for controlling ON/OFF operation of transfer gate $PTG_i$.

In the charge pump circuit comprised as shown in FIG. 8, clock clk is applied to the pumping capacitors $C_i$ in odd-numbered booster stages, and clock /clk is applied to pumping capacitors $C_i$ in even-number booster stages. With the change in clocks clk and /clk, the charge accumulated in pumping capacitor $C_i$ of each stage is passed through transfer gate $PTG_i$ and supplied to the next stage, thereby sequentially boosting node $ND_i$ in each stage.

During the boosting operation of this charge pump circuit, the ON/OFF operation of each transfer gate $PTG_i$ is controlled by means of the serial circuit including a PMOS transistor $PT_i$ and an NMOS transistor $NT_i$. Thus, the problem of loss by threshold voltage $V_{th}$ during the boosting process as described above is solved.

N wells of the PMOS transistors constituting transfer gates $PTG_i$ are also formed separately for each PMOS transistor in the charge pump circuit shown in FIG. 8. Influence of the substrate bias effect on the PMOS transistors can thus be prevented.

It is not possible, however, to prevent influence of the substrate bias effect on NMOS transistors in this conventional charge pump circuit. Normal operation of the NMOS transistor in each following booster stage may thus be prevented by the substrate bias effect.

FIG. 9 shows the potential of nodes $ND_i$ (where i=n-2 to n) in booster stages n-2 to n in the charge pump circuit shown in FIG. 8. As shown in FIG. 9, the node potential of any booster stage in period A is different from the one in period B. For example, the potential in period A is higher than the potential in period B at node $ND_{n-1}$. As a result, the potential of the N well to which the back gate of the PMOS transistor is connected changes according to the potential of clock clk, and current consumption in the N well occurs with this potential change. Because the area of the N well is large on the substrate, this current consumption becomes also large, and the efficiency of the charge pump circuit is thus degraded.

In the charge pump circuit described above, there are following problems: a voltage loss equivalent to the threshold voltage $V_{th}$ of the MOS transistors constituting the charge pump circuit; the substrate bias effect; and current consumption in the N wells as a result of a change in node potential as the clock output changes. Therefore, the efficiency drops and booster capacity is limited as a result of problems described above.

SUMMARY OF THE INVENTION

An object of the present invention is to resolve the aforementioned problems by providing a charge pump circuit whereby booster efficiency is improved and a high voltage can be achieved.

To achieve the above-noted object, a charge pump circuit is provided. The charge pump circuit according to the invention comprises a plurality of booster stages. Each booster stage comprises a first node, a second node, a first charge pump and a second charge pump. The first node of one booster stage is connected to the second node of a booster stage immediately before said one booster stage. The first charge pump boosts potential of the second node by accumulating charge supplied through the first node and supplying said accumulated charge to the second node. The second charge pump also boosts potential of the second node by accumulating charge supplied through the first node and supplying said accumulated charge to the second node. The first charge pump and the second charge pump operate complementarily such that one of said charge pumps is supplying charge to the second node while the other of said charge pumps electric collects charge input through the first node.

In the charge pump circuit, the first charge pump may comprise a first pumping capacitor of which one end is connected to a first clock, a first NMOS transistor of which the drain is connected to the other end of the first pumping capacitor and the source is connected to the first node, and a first PMOS transistor of which the drain is connected to the other end of the first pumping capacitor and the source is connected to the second node. The second charge pump may comprise a second pumping capacitor of which one end is connected to a second clock that has a value complementary to the first clock, a second NMOS transistor of which the drain is connected to another side of the second pumping capacitor, and the source is connected to the first node, and a second PMOS transistor of which the drain is connected to another side of the second pumping capacitor and the source is connected to the second node. The gates of the first NMOS transistor and the first PMOS transistor may be connected to the second clock via the second pumping capacitor. The gates of the second NMOS transistor and the second PMOS transistor may be connected to the first clock via the first pumping capacitor.

Furthermore, in the charge pump circuit, N wells of the first and second PMOS transistors may be formed separately in a predetermined number of booster stages.

Furthermore, in the charge pump circuit, P wells of the first and second NMOS transistors may be formed separately in a predetermined number of booster stages.

Furthermore, when the charge pump circuit is formed on a P substrate together with other circuits, impurity concentration of the P substrate on which the first and second NMOS transistors of the charge pump circuit are formed may be lower than impurity concentration of P wells of NMOS transistors included in the other circuits.

Furthermore, the charge pump circuit may comprise an output selector to output either a second node voltage of the last booster stage or power supply voltage based on the power supply voltage and the second node voltage.

Furthermore, the first node of the first booster stage may be used as an input/output node of the charge pump circuit, and the second node of the last booster stage may be used as an output/input node of the charge pump circuit, thereby a voltage from the output node can be higher/lower than a voltage from the input node.

By the charge pump circuit of the invention, operating efficiency, that is, boosting efficiency, of the charge pump circuit is improved, in addition, a high boosting efficiency can be achieved because two charge pumps are complementarily used to boost the potential of a second node in one booster stage. It is also possible to eliminate loss of the threshold voltage $V_{th}$ at each booster stage. Furthermore, the substrate bias effect can be suppressed on the PMOS transistors or the NMOS transistors, and reliable switching can be carried out even in later booster stages. Consequently, a charge pump circuit with a high boosting capacity can be achieved.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which.

DESCRIPTION OF THE PREFERRED EMBODIMENTS

The preferred embodiments of the present invention are described below with reference to the accompanying drawings.

(First Embodiment)

Figure 1A:
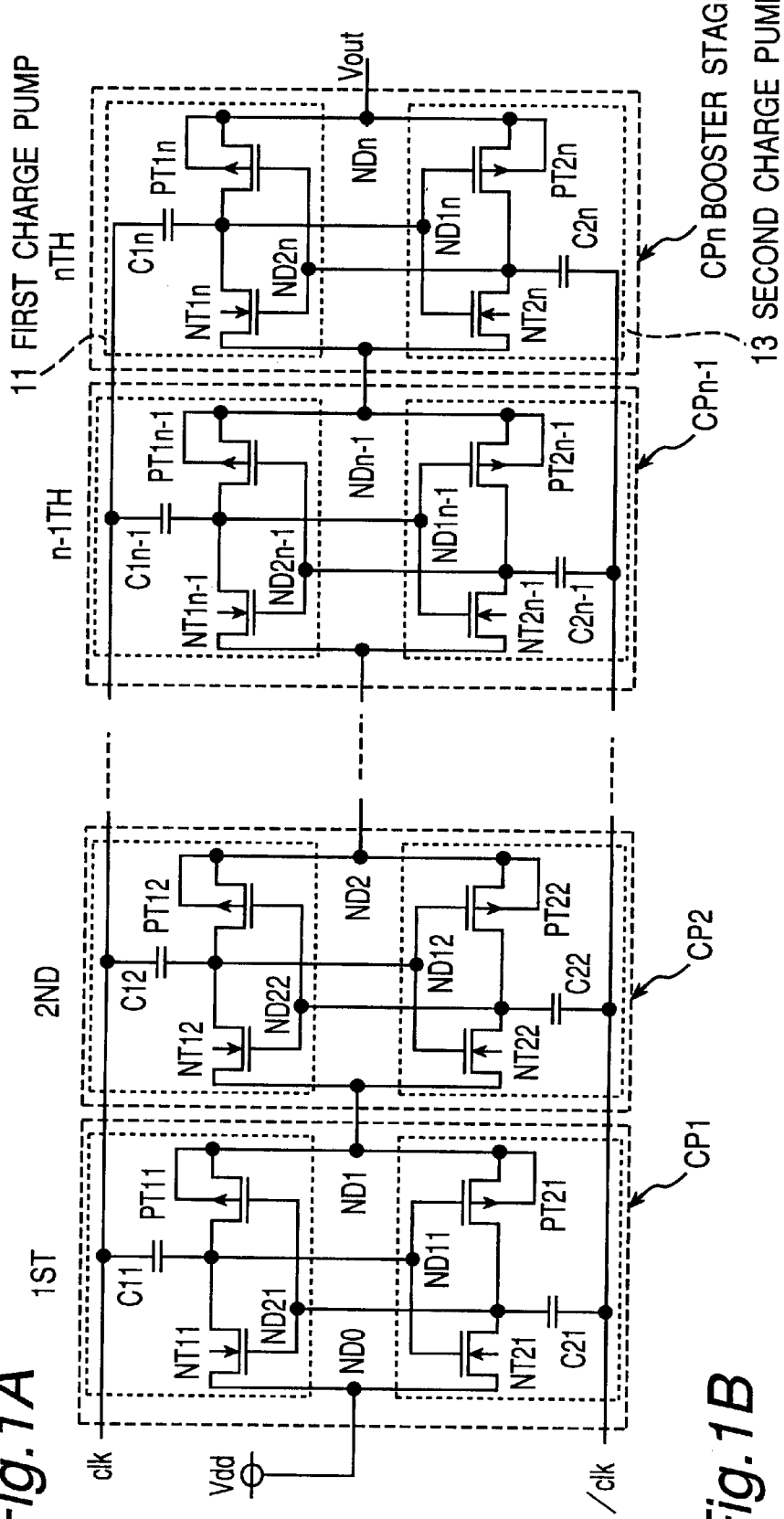
FIG. 1A is a circuit diagram of a charge pump circuit according to a first preferred embodiment of the present invention.

FIG. 1A is a circuit diagram of a charge pump circuit according to a first preferred embodiment of the present invention. As shown in FIG. 1, the charge pump circuit comprises a plurality of booster stages $CP_1$ to $CP_n$ connected in series. A clock clk and a clock /clk are applied to each booster stages $CP_1$ to $CP_n$. The clock clk outputs 0 Volt or a voltage equivalent to power supply voltage level $V_{dd}$. The clock /clk outputs complementary levels to the clock clk. Each of the booster stages is identically configured. Hence, the configuration and operation thereof are described below generally with reference to the nth (numbered n) booster stage $CP_n$ as typical of each other booster stage.

Each booster stage $CP_n$ comprises a node $ND_{n-1}$ as an input node through which a charge is supplied, and a node $ND_n$ as an output node from which the charge is supplied to the input node of the next (downstream) booster stage $CP_{n+1}$. The input node $ND_{n-1}$ of one booster stage $CP_n$ is thus also the output node of the previous booster stage $CP_{n-1}$.

Booster stage $CP_n$ further comprises first and second charge pumps 11 and 13 for raising the potential of the node $ND_n$ by transferring a charge input from the node $ND_{n-}$ to the node $ND_n$. The first charge pump 11 and second charge pump 13 operate complementarily, as described below.

Each of the first and second charge pumps 11 and 13 comprises pumping capacitors $C1_n$ and $C2_n$, NMOS transistors $NT1_n$ and $NT2_n$, and PMOS transistors $PT1_n$ and $PT2_n$. The NMOS transistors $NT1_n$ or $NT2_n$ sends a charge input through the node $ND_{n-1}$, to the corresponding pumping capacitor $C1_n$ or $C2_n$, respectively. The PMOS transistors $PT1_n$ or $PT2_n$ sends the charge accumulated in the corresponding pumping capacitor $C1_n$ or $C2_n$ to the node $ND_n$, respectively In the first charge pump 11, the source of NMOS transistor $NT1_n$ is connected to the node $ND_{n-1}$, and the drain is connected to the clock clk through the pumping capacitor $C1_n$. The drain of PMOS transistor $PT1_n$ is connected to the clock clk through the pumping capacitor $C1_n$, and the source is connected to the node $ND_n$. The gates of NMOS transistor $NT1_n$ and PMOS transistor $PT1_n$ are connected to clock /clk through pumping capacitor $C2_n$. The node connecting the gates of NMOS transistor $NT1_n$ and PMOS transistor $PT1_n$ with pumping capacitor $C2_n$ is referred to below as node $ND2_n$.

Similarly in the second charge pump 13, the source of NMOS transistor $NT2_n$ is connected to the node $ND_{n-1}$, and the drain is connected to clock /clk through pumping capacitor $C2_n$. The drain of PMOS transistor $PT2_n$ is connected to the clock /clk through pumping capacitor $C2_n$, and the source is connected to the node $ND_n$. The gates of NMOS transistor $NT2_n$ and PMOS transistor $PT2_n$ are connected to clock clk through pumping capacitor $C1_n$. The node connecting the gates of NMOS transistor $NT2_n$ and PMOS transistor $PT2_n$ with the pumping capacitor $C1_n$ is referred to below as node $ND1_n$.

Figure 1B:
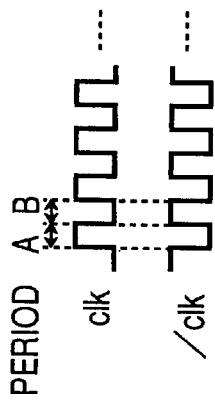
FIG. 1B is a diagram showing the waveform of the clock in the charge pump circuit shown in FIG. 1A.
Figure 1C:
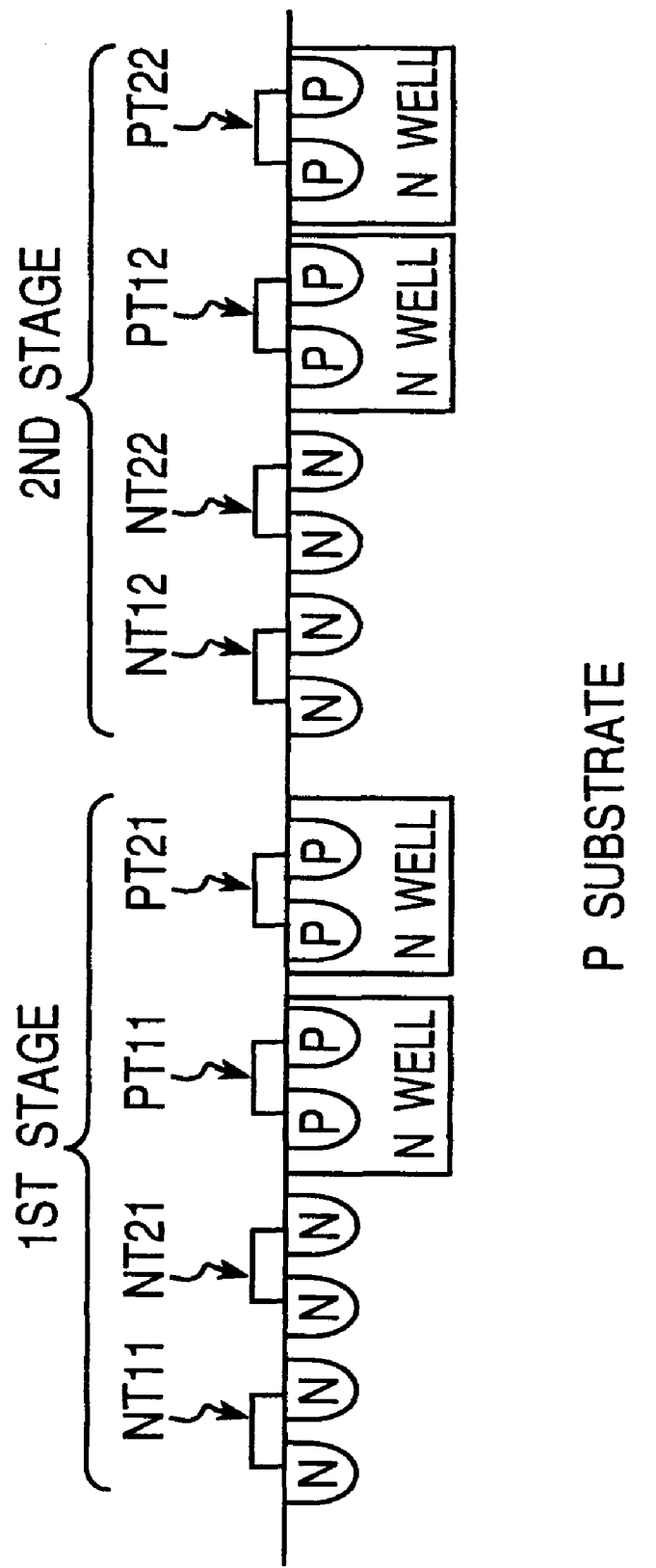
FIG. 1C is a section view of a semiconductor substrate of a charge pump circuit according to the first embodiment, in which each N well is formed for every PMOS transistor.

In the charge pump circuit of this embodiment, the PMOS transistors $PT1_i$, $PT2_i$ (where i=1 to n) of each stage are formed over an N well in a P substrate, and each N well is separately formed in every PMOS transistor as shown in FIG. 1C. In this case, each N well may be separately formed in every one or more of booster stages as described in another embodiment. This can suppress the substrate bias effect.

Operation of a charge pump circuit thus comprised is described next below. The following description is generalized for application to every booster stage by referring to the nth booster stage $CP_n$.

In the charge pump circuit, the potential of node $ND_n$ is raised by complementarily operating two charge pumps 11 and 13. Output voltage $V_{out}$ is obtained from the final output node $ND_n$ of the charge pump circuit by means of each booster stage $CP_i$ (where i=1 to n) sequentially raising the potential of node $ND_i$.

Referring to FIG. 1B, the operation of booster stage $CP_n$ is described below in periods A and B. In period A, clock clk outputs voltage $V_{dd}$ and clock /clk outputs 0 Volt. In period B, clock clk outputs 0 Volt and clock /clk outputs voltage $V_{dd}$.

In period A, the potential of node $ND1_n$ rises by voltage $V_{dd}$ due to capacitance coupling with pumping capacitor $C1_n$ since clock clk supplies voltage $V_{dd}$. The potential of node $ND2_n$ also drops because clock /clk supplies 0 Volt. As a result, NMOS transistor $NT2_n$ and PMOS transistor $PT1_n$ go on, and PMOS transistor $PT2_n$ and NMOS transistor $NT1_n$ go off.

In second charge pump 13, node $ND_{n-1}$ is connected to one end of pumping capacitor $C2_n$ when NMOS transistor $NT2_n$ is on. An electric charge is thus supplied from the previous booster stage $CP_{n-1}$ through node $ND_{n-1}$ to pumping capacitor $C2_n$, and hence pumping capacitor $C2_n$, is charged.

In first charge pump 11, node $ND_n$, is connected to one end of pumping capacitor $C1_n$ when PMOS transistor $PT1_n$ is on. The charge accumulated in pumping capacitor $C1_n$ is thus transferred to node $ND_n$, and the potential of node $ND_n$ rises.

In period B, th e potential of node $ND2_n$ rises by voltage $V_{dd}$ due to capacitance coupling with pumping capacitor $C2_n$ since clock /clk outputs voltage $V_{dd}$. The potential of node $ND1_n$ also drops because clock clk supplies 0 Volt. As a result, NMOS transistor $NT1_n$ and PMOS transistor $PT2_n$ are on, and PMOS transistor $PT1_n$ and NMOS transistor $NT2_n$ are off.

In first charge pump 11, node $ND_{n-1}$ and one end of pumping capacitor $C1_n$ are connected when NMOS transistor $NT1_n$ is on. A charge is thus supplied from the previous booster stage $CP_{n-1}$ through node $ND_{n-1}$ to pumping capacitor $C1_n$, and pumping capacitor $C1_n$ is charged with the charge.

In second charge pump 13, node $ND_n$ and one end of pumping capacitor $C2_n$ are connected when PMOS transistor $PT2_n$ is on. The charge charged in pumping capacitor $C2_n$ is thus transferred to node $ND_n$, and the potential of node $ND_n$ rises.

In both period A and period B, node $ND_n$ is connected to the pumping capacitor $C1_n$ or $C2_n$ that is connected to the clock from which voltage $V_{dd}$ is currently supplied. Therefore, the potential of node $ND_n$ is boosted in both periods A and B, that is, boosted irrespective of a change in the clock clk or /clk.

Figure 2:
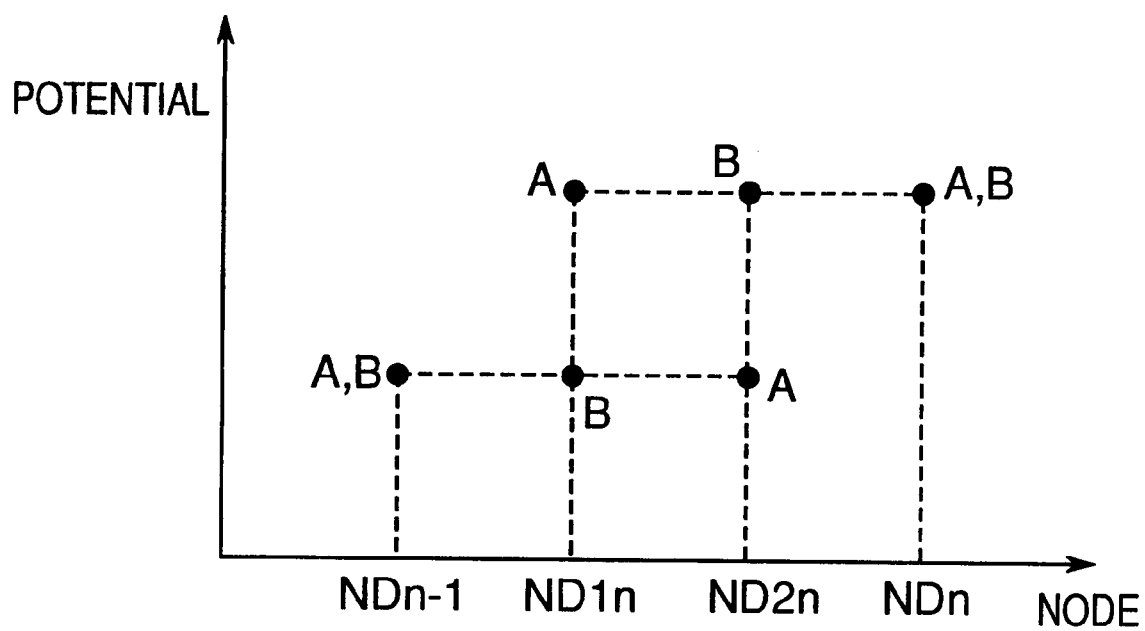
FIG. 2 is a graph showing the change in the potential of each node in the nth booster stage the charge pump circuit shown in FIG. 1A.

FIG. 2 is a graph showing the change in the potential of each node of booster stage $CP_n$ in period A and period B. As shown in this figure, the potential of node $ND_{n-1}$ which is the output node of booster stage $CP_n$ and the potential of node $ND_n$ which is the output node of booster stage $CP_n$, are same in period A and period B.

As a result, node $ND_i$ is boosted in each of the other booster stages $CP_i$ (where i=1 to n-1) by the first charge pump (with capacitor C1i) in period A, and by the second charge pump (with capacitor $C2_i$) in period B. By thus using two charge pumps, the output node $ND_i$ of every booster stage can be constantly boosted to a higher potential. That is, the potential of the output node $ND_i$ can be held constant irrespective of the clock phase. Therefore, the potential of N well of the PMOS transistor connected to the output node of each booster stage does not change according to the clock, and hence current consumption in the N well resulting from a change in the clock output can be suppressed. The boosting performance can be improved since two charge pumps in each booster stage perform alternately continuous booster operation.

The first and second charge pumps charge the pumping capacitor with a charge from the previous booster stage through the NMOS transistor, and transfer charge charged in the pumping capacitor to the next booster stage through the PMOS transistor. Switching between the NMOS transistor and PMOS transistor at this time, that is, the gate voltages of those transistors, is controlled based on the clock complementary to the clock connected to the drains of that transistor. This prevents loss equivalent to the threshold voltage $V_{th}$ from occurring on the boosting operation.

The charge pump circuit of this preferred embodiment has been described with the power supply voltage $V_{dd}$ connected to input node $ND_0$ of the first booster stage $CP_1$, and output voltage $V_{out}$ obtained from output node $ND_n$ of the nth booster stage $CP_n$. That is, the input node of the first booster stage is used as an input node of the charge pump circuit, and the output node of the last booster stage is used as an output node of the charge pump circuit. The invention is not so limited, however, and it is also possible to ground node $ND_n$ of the final booster stage $CP_n$ (that is, to connect node $ND_n$ to a reference potential line), and to obtain output voltage $V_{out}$ from node $ND_0$ of the first booster stage $CP_1$. When thus comprised, output voltage $V_{out}$ is a negative voltage, i.e. a dropped voltage. That is, the input node of the first booster stage can be used as an output node of the charge pump circuit, and the output node of the last booster stage can be used as an input node of the charge pump circuit, thereby a dropped voltage can be obtained.

(Second Embodiment)

Figure 3A:
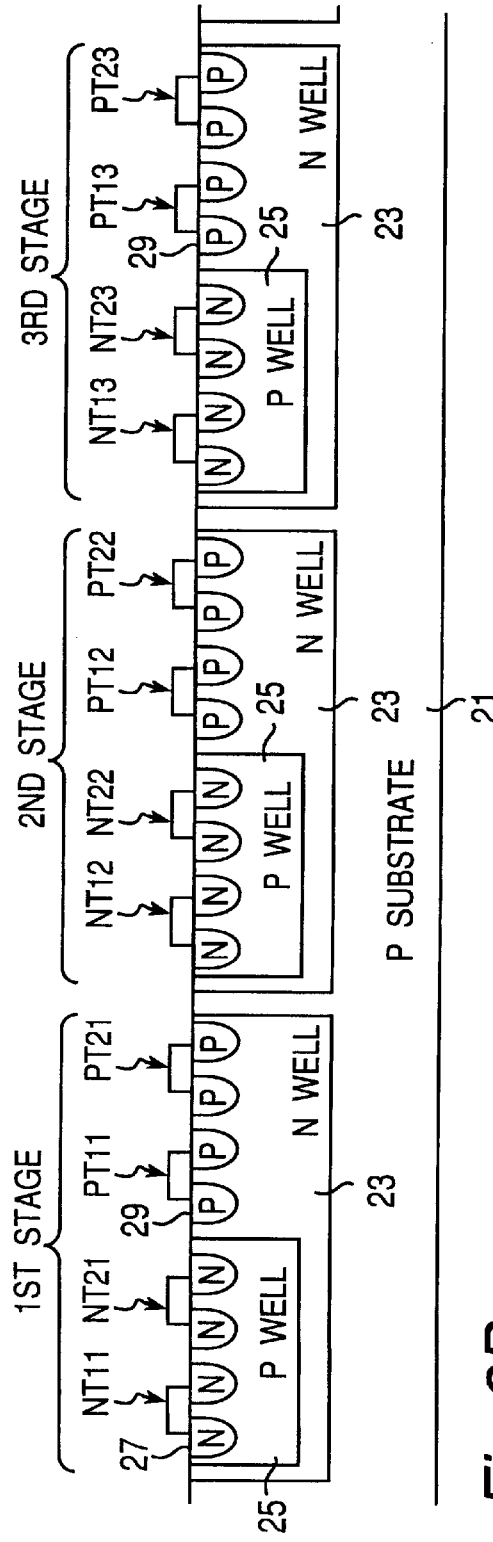
FIG. 3A is a section view of a semiconductor substrate of a charge pump circuit according to another preferred embodiment of the present invention, in which each N well and P well are formed for every booster stage.
Figure 3B:
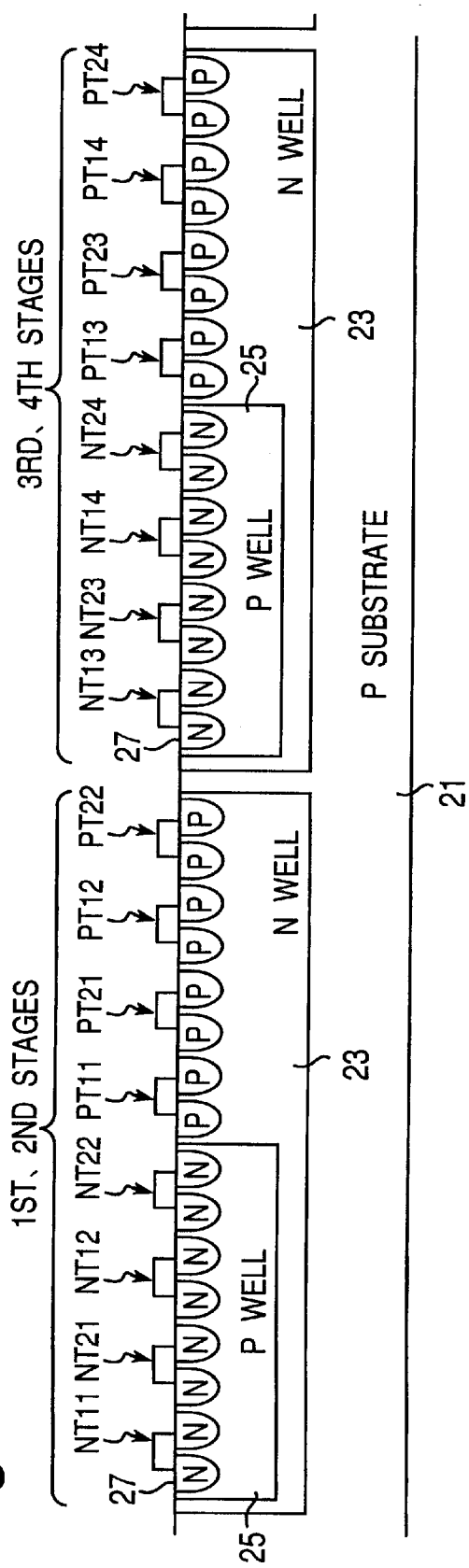
FIG. 3B is a section view of a semiconductor substrate of a charge pump circuit according to another preferred embodiment of the present invention, in which each N well and P well are formed for every two booster stages.
Figure 4:
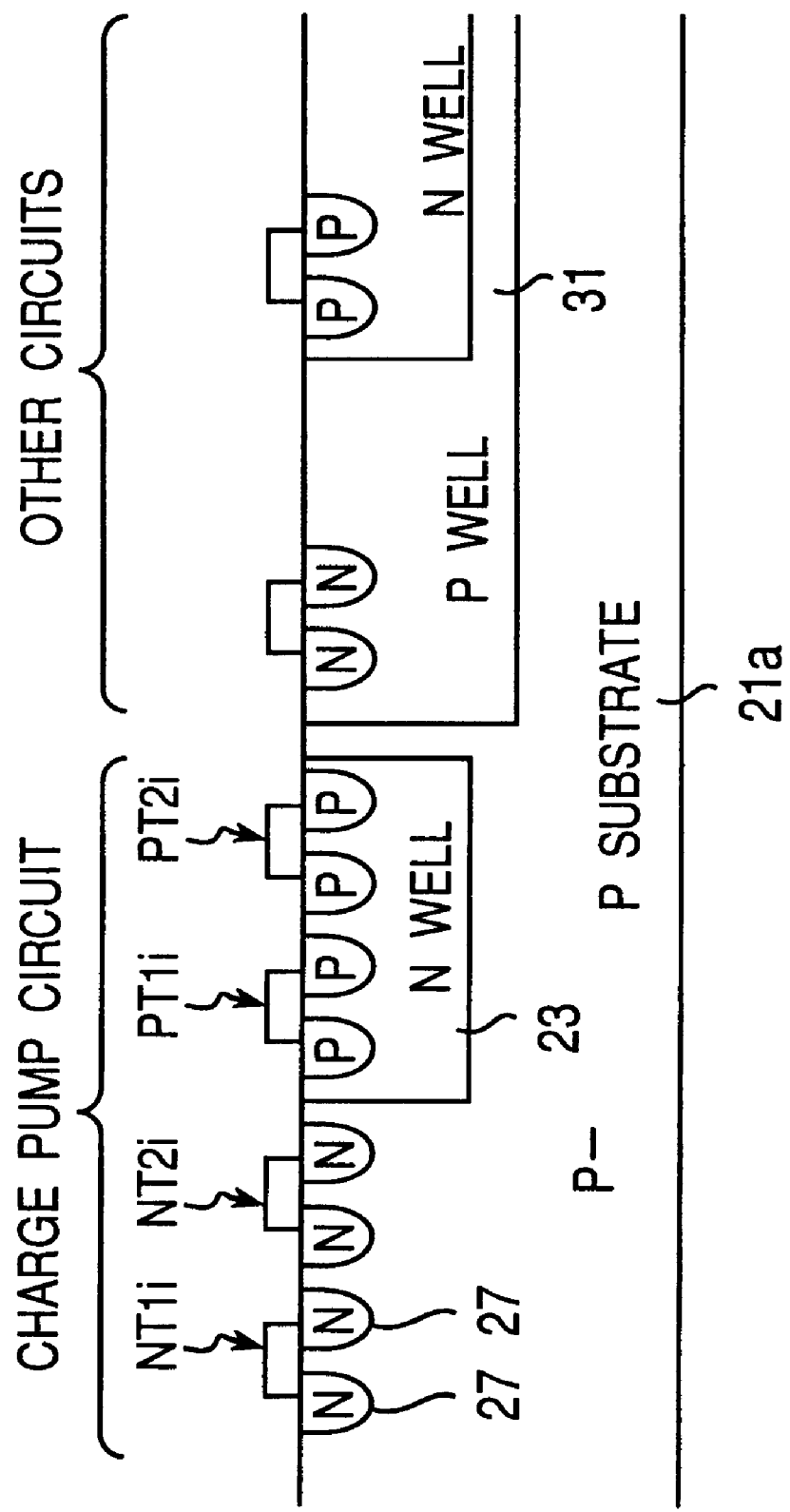
FIG. 4 is a section view of the semiconductor substrate of a charge pump circuit according to a third embodiment of the invention.

FIGS. 3A and 3B are section views of a semiconductor substrate in which is formed a charge pump circuit according to another preferred embodiment of the present invention. In the first embodiment, each N well for forming PMOS transistor is formed separately in every PMOS transistor. In this embodiment as shown in FIG. 3A, however, N well 23 in P substrate 21 is formed separately in every booster stage, and a P diffused layer 29 is formed in the N well 23 for forming PMOS transistors $PT1_1$, $PT2_1$... In addition, a P well 25 is formed within N well 23, and an N diffused layer 27 is formed within P well 25 for forming NMOS transistors $NT1_1$, $NT2_1$....

By thus forming P well 25 for an NMOS transistor in the N well 23, and separating the P well 25 from the P substrate 21, the source of an NMOS transistor formed in the P well 25 has the same potential as the P well 25, and hence the substrate bias effect can be prevented. It is thus also possible to prevent a rise in the threshold voltage in subsequent booster stages. As a result, this enables reliable NMOS transistor switching even in later booster stages, and thus makes it possible to build a charge pump circuit with a large number of booster stages. This can provide a charge pump circuit with a high booster capacity.

It will also be obvious to those who have ordinary skill in the art that the invention is not be so limited, while one N well 23 is formed separately for every booster stage as shown in FIG. 3A. That is, it is possible to form one separate N well 23 for every two booster stages as shown FIG. 3B, or every predetermined number (more than two) of booster stages. In addition, one P well 25 can likewise be formed separately for one or more predetermined number of booster stages.

(Third Embodiment)

Generally, the substrate bias effect diminishes as the impurity concentration of the P substrate is reduced. It is therefore preferable to form a charge pump circuit on a substrate with a low impurity concentration. However, the increased design resolution of current semiconductor technologies requires a high impurity concentration.

To solve this problem, in case that the charge pump circuit and other circuits are formed together on a substrate (P substrate), impurity concentration in the P substrate is lower than impurity concentration in P well of other circuits. As a result, the substrate bias effect on the charge pump circuit can be suppressed without affecting other circuit blocks.

More specifically, in P substrate 21a, P well 31 is formed with impurity concentration higher than impurity concentration of the P substrate 21a, and the transistors of other circuits except for the charge pump circuit are formed in this P well 31. In the charge pump circuit, N diffused layer 27 is formed in the P substrate 21a for the NMOS transistors $NT1_i$ and $NT2_i$. N well 23 is also formed on P substrate 21a, and P diffused layer is formed in the N well 23 for PMOS transistors $PT1_i$ and $PT2_i$.

By thus forming only the charge pump circuit at an area of the P substrate 21a with a low impurity concentration, the substrate bias effect can be suppressed without separating the P well 25 from the P substrate 21 as shown in the second embodiment.

(Fourth Embodiment)

Figure 5:
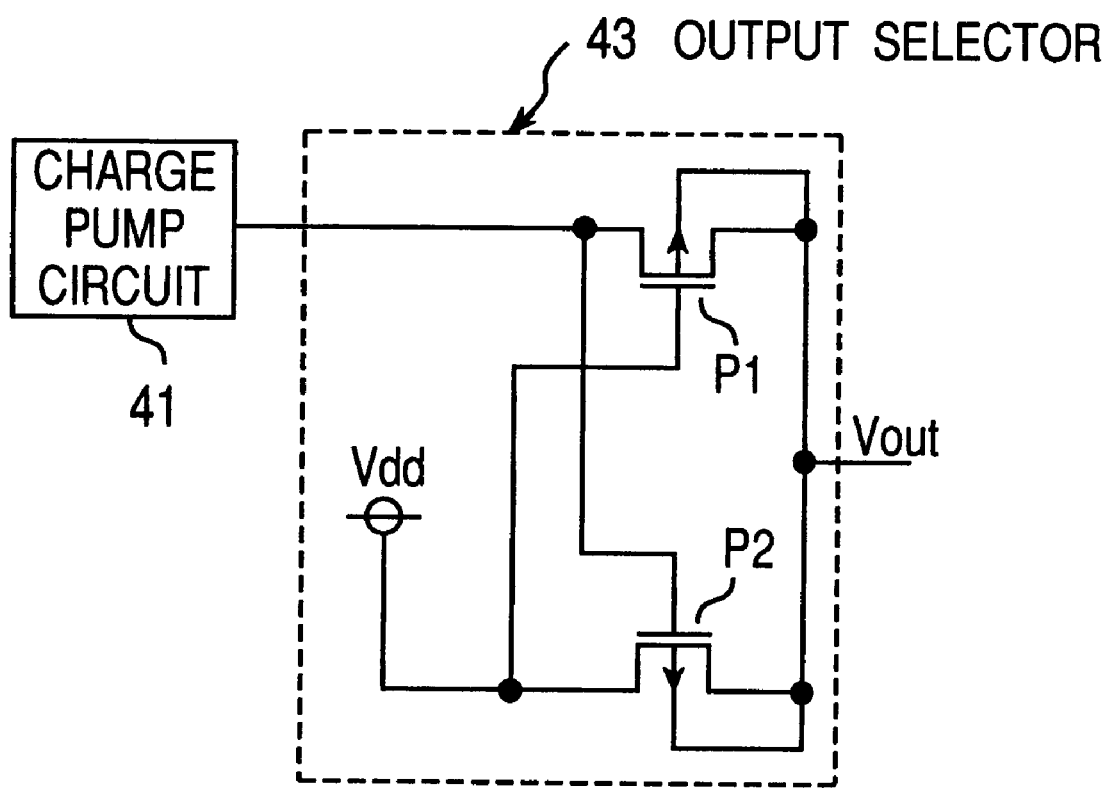
FIG. 5 is a diagram of a typical charge pump circuit according to a fourth embodiment of the invention.
Figure 6:
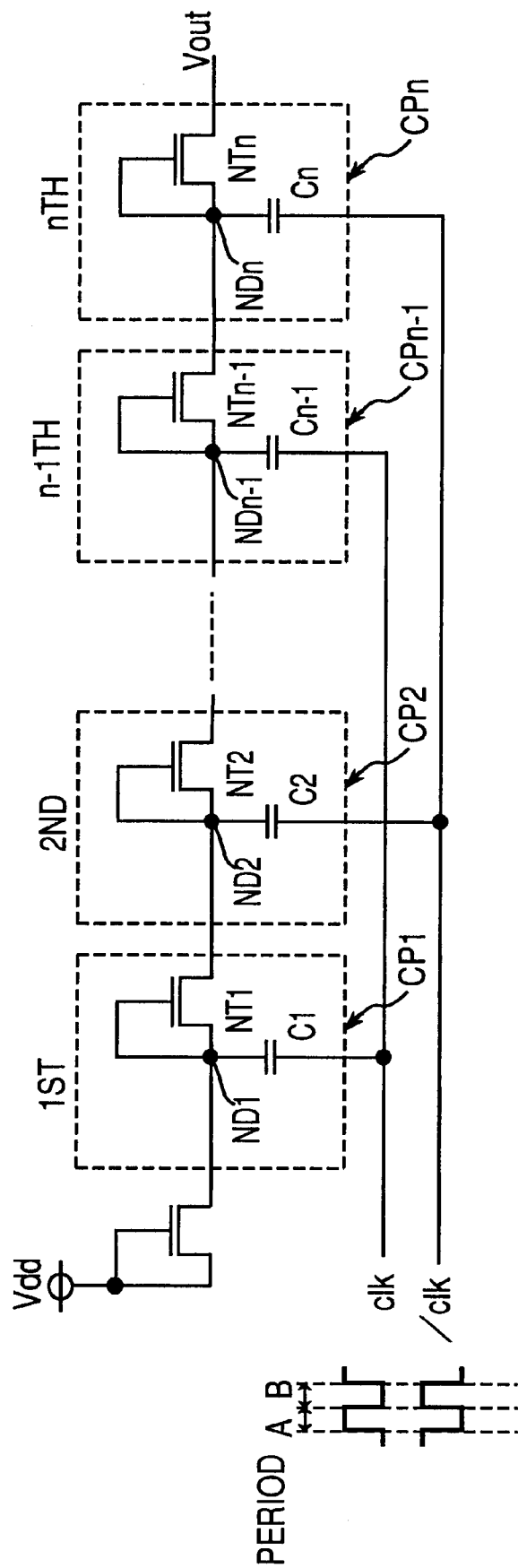
FIG. 6 is a circuit diagram of a conventional charge pump circuit.
Figure 7:
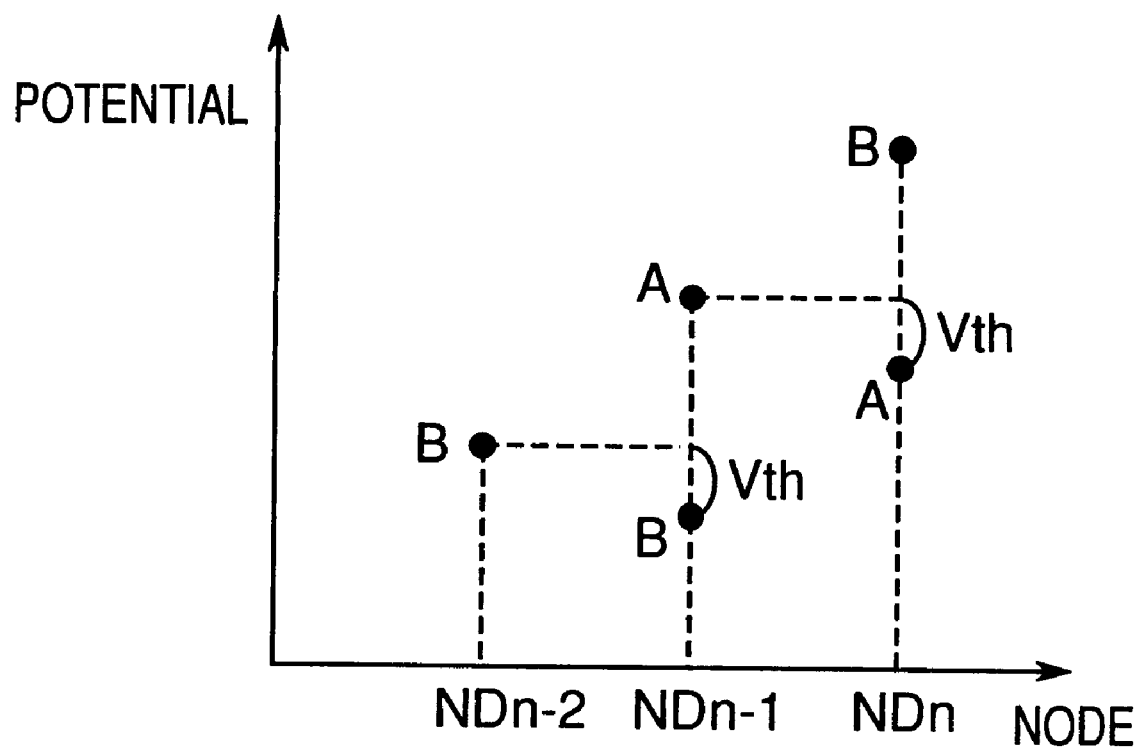
FIG. 7 is a graph showing the change in potential of each node of the conventional charge pump circuit shown in FIG. 6.
Figure 8:
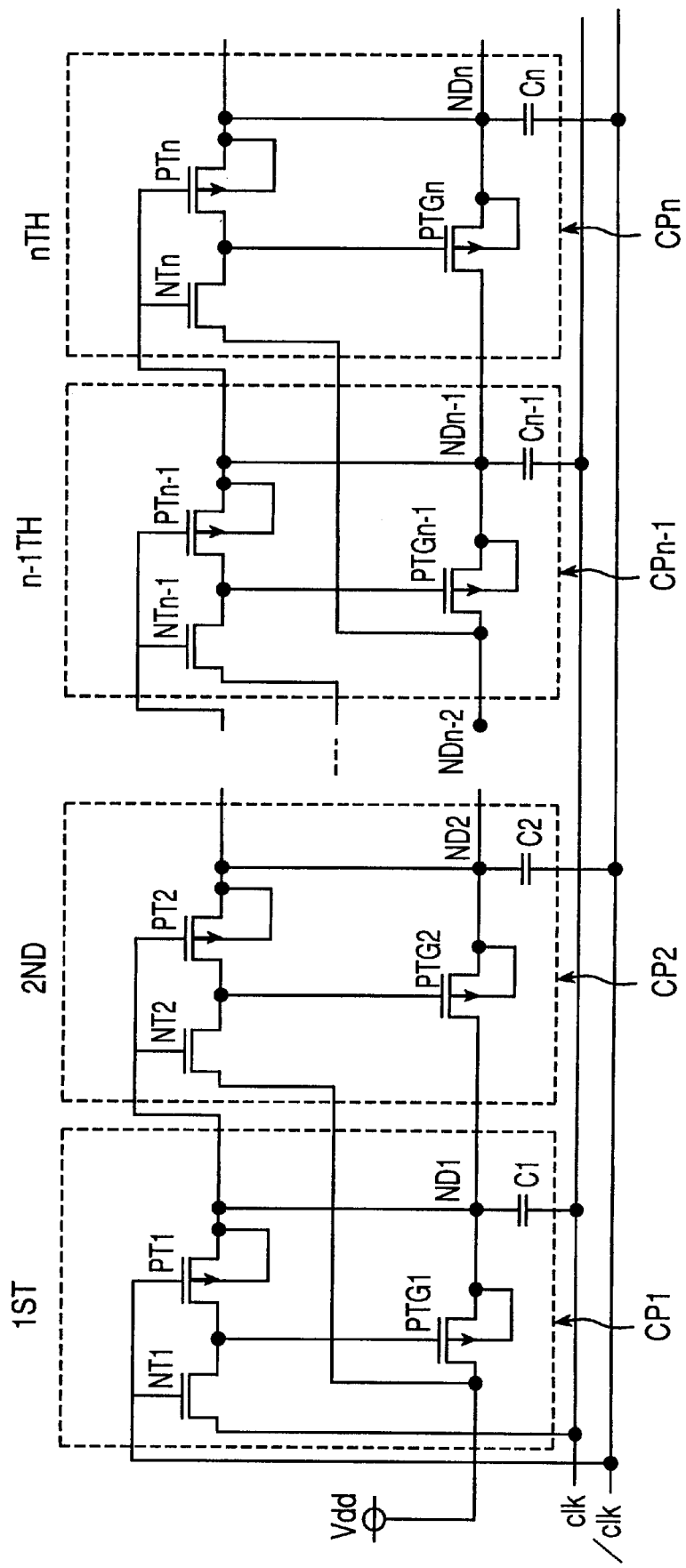
FIG. 8 is a typical circuit diagram of a charge pump circuit according to a second example of the prior art.
Figure 9:
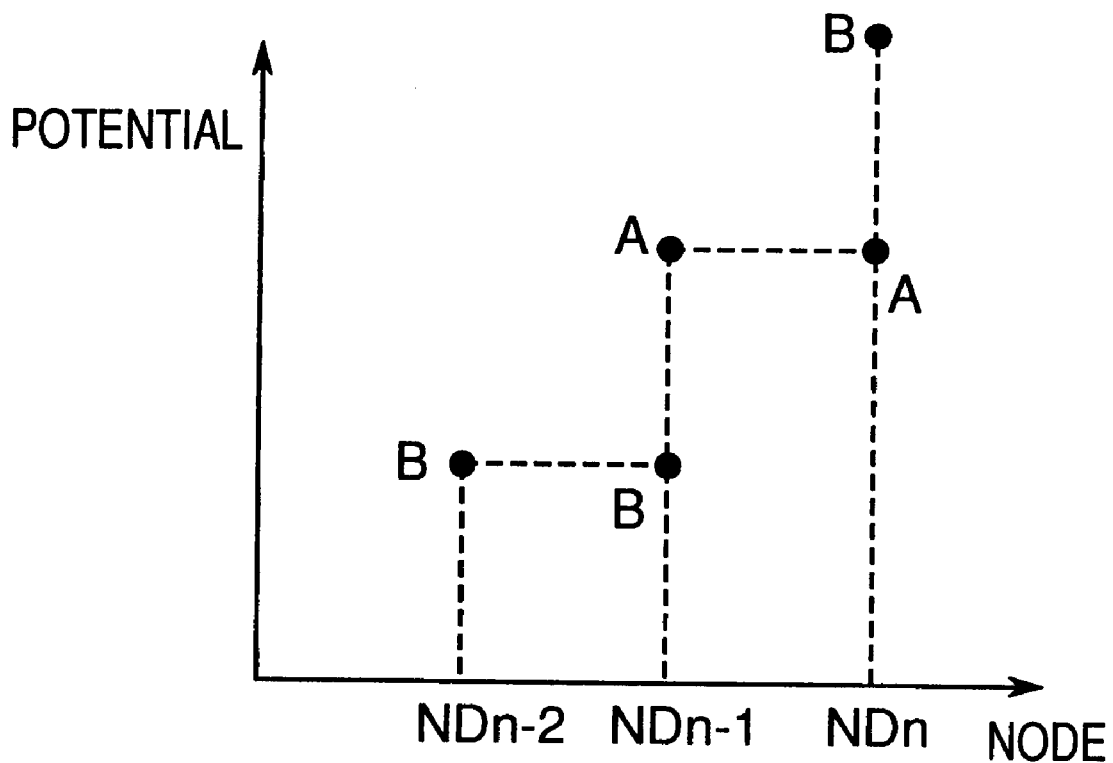
FIG. 9 is a graph showing the change in potential of each node of the conventional charge pump circuit shown in FIG. 8.

FIG. 5 is a typical diagram of a charge pump circuit according to a fourth embodiment of the present invention. This charge pump circuit further comprises an output selector 43 connected to the charge pump circuit 41 which is a charge pump circuit according to any one of the preceding embodiments.

The output selector 43 comprises two PMOS transistors $P_1$ and $P_2$. The drain of PMOS transistor $P_1$ is connected to the output of the charge pump circuit 41, and the gate is connected to power supply voltage $V_{dd}$. The drain of PMOS transistor $P_2$ is connected to power supply voltage $V_{dd}$ and the gate to the output of the charge pump circuit 41. The sources of both PMOS transistor $P_1$ and PMOS transistor $P_2$ are connected to the output of the output selector 43.

With the output selector 43 thus comprised, PMOS transistor $P_1$ goes on and PMOS transistor $P_2$ goes off when sufficiently high boosted voltage is output from the charge pump circuit 41a. The output selector 43 thus outputs the high voltage from the charge pump circuit 41 as output voltage $V_{out}$.

However, when the output voltage from the charge pump circuit 41 is sufficiently low relative to the power supply voltage $V_{dd}$, PMOS transistor $P_2$ goes on and PMOS transistor $P_1$ goes off. In this case, the output selector 43 outputs the power supply voltage $V_{dd}$ as output voltage Hence, the output selector 43 selectively outputs either the power supply voltage $V_{dd}$ or the output voltage from the charge pump circuit 41 based on the output from the charge pump circuit 41.

Therefore, by providing the output selector 43 at the output end of the charge pump circuit 41, it is possible to select either the output from the charge pump circuit 41 or the power supply voltage $V_{dd}$.

In the charge pump circuit 41, cutting off the supplying clock clk and /clk in the charge pump circuit 41 and grounding each node of each booster stage $CP_1$ (where i=1 to n) can make the output voltage of the charge pump circuit 41 set to 0 V or a sufficiently low level.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A charge pump circuit comprises a plurality of booster stages, each booster stage comprising:
    a first node;
    a second node, the first node of one booster stage being connected to the second node of a booster stage immediately before said one booster stage;
    a first charge pump to boost potential of the second node by accumulating charge supplied through the first node and supplying said accumulated charge to the second node; and
    a second charge pump to boost potential of the second node by accumulating charge supplied through the first node and supplying said accumulated charge to the second node;

wherein the first charge pump and second charge pump operate complementarily such that one of said charge pumps is supplying charge to the second node while the other of said charge pumps electric collects charge input through the first node.

2. The charge pump circuit according to claim 1, wherein (a) said first charge pump comprises a first pumping capacitor of which one end is connected to a first clock, a first NMOS transistor of which the drain is connected to the other end of the first pumping capacitor, and the source is connected to the first node, and a first PMOS transistor of which the drain is connected to the other end of the first pumping capacitor, and the source is connected to the second node;

(b) said second charge pump comprises a second pumping capacitor of which one end is connected to a second clock, the second clock having a value complementary to the first clock, a second NMOS transistor of which the drain is connected to another side of the second pumping capacitor, and the source is connected to the first node, and a second PMOS transistor of which the drain is connected to another side of the second pumping capacitor, and the source is connected to the second node; and (c) the gates of the first NMOS transistor and the first PMOS transistor are connected to the second clock via the second pumping capacitor, and the gates of the second NMOS transistor and the second PMOS transistor are connected to the first clock via the first pumping capacitor.

3. The charge pump circuit according to claim 2, wherein N wells of the first and second PMOS transistors are formed separately in every predetermined number of booster stages.

4. The charge pump circuit according to claim 2, wherein P wells of the first and second NMOS transistors are formed separately in every predetermined number of booster stages.

5. The charge pump circuit according to claim 2, wherein when said charge pump circuit is formed on a p substrate together with other circuits, impurity concentration of the P substrate on which the first and second NMOS transistors of the charge pump circuit are formed is lower than impurity concentration of P wells of NMOS transistors included in said other circuits.

6. The charge pump circuit according to claim 1, further comprising an output selector to output either a second node voltage of the last booster stage or power supply voltage based on the power supply voltage and said second node voltage.

7. The charge pump circuit according to claim 1, wherein the first node of the first booster stage is used as an input node of the charge pump circuit, and the second node of the last booster stage is used as an output node of the charge pump circuit, thereby a voltage from the output node is higher than a voltage from the input node.

8. The charge pump circuit according to claim 1, wherein the first node of the first booster stage is used as an output node of the charge pump circuit, and the second node of the last booster stage is used as an input node of the charge pump circuit, thereby a voltage from the output node is lower than a voltage from the input node.

* * * * *